Sept. 3, 1957 — W. V. SMITH — 2,805,072
METHOD OF TOUGHENING GOLF BALL COVERS
Filed Nov. 10, 1955
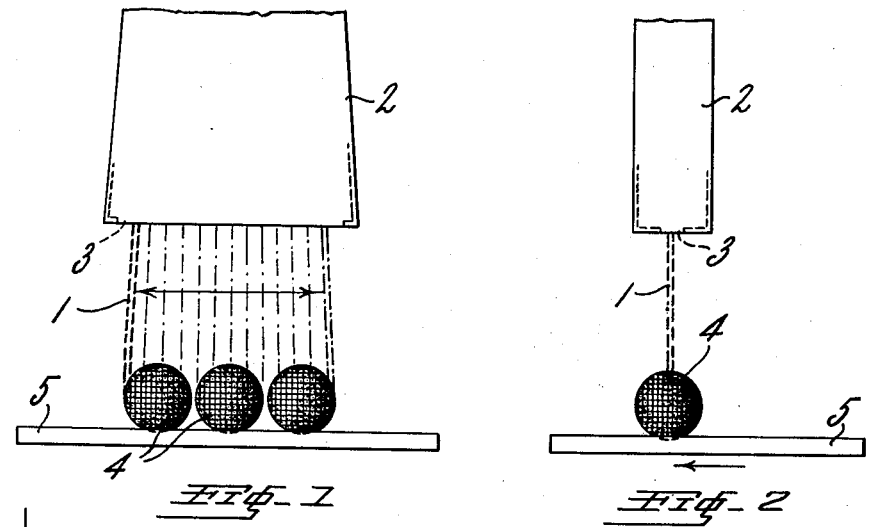
Fig. 1    Fig. 2
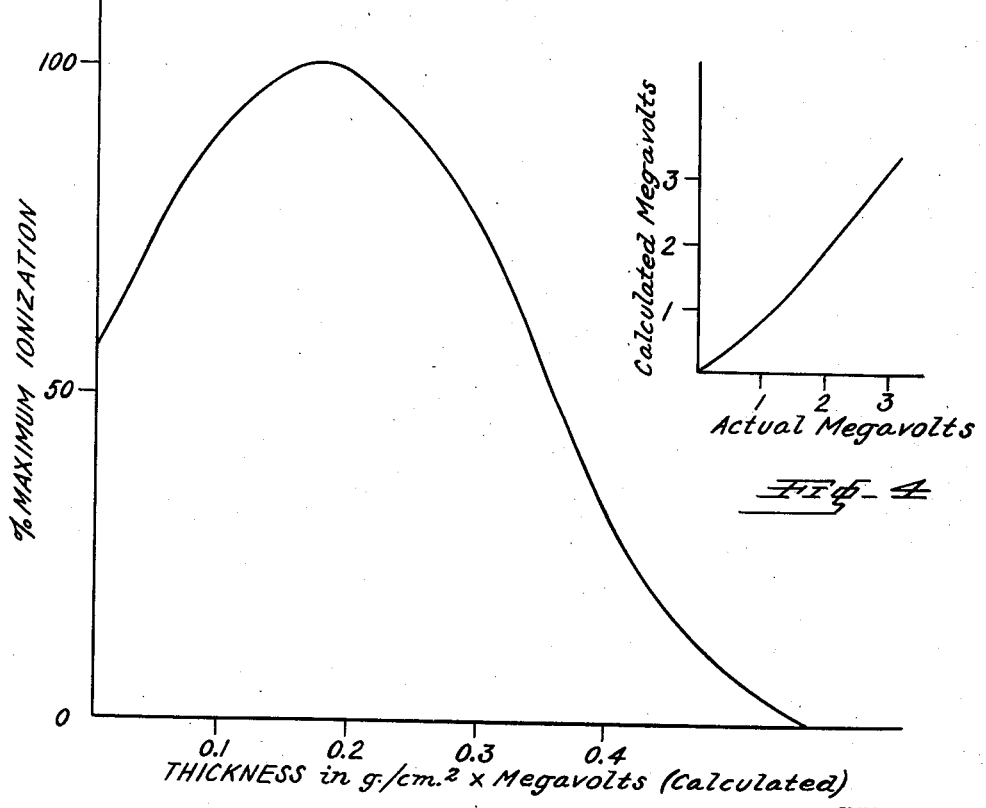
Fig. 3
Fig. 4
INVENTOR.
WENDELL V. SMITH
BY James J. Long
AGENT United States Patent Office 2,805,072
Patented Sept. 3, 1957

2,805,072

METHOD OF TOUGHENING GOLF BALL COVERS

Wendell V. Smith, Nutley, N. J., assignor to United States Rubber Company, New York, N. Y., a corporation of New Jersey Application November 10, 1955, Serial No. 546,121

3 Claims. (Cl. 273—235)

This invention relates to golf balls and more particularly to golf balls in which the toughness of the cover has been increased by irradiation so that unusually good scuffing and cutting resistance is conferred upon the cover. In one aspect of my invention, it relates to golf balls having a polyethylene cover irradiated and thereby made better than polyethylene-covered balls produced by any other known method. In another aspect, my invention relates to the curing of balata-covered golf balls whereby the advantage of good scuffing and cutting resistance in the balata cover is achieved and whereby the necessity of compounding the balata cover with vulcanizing ingredients and subjecting the balls to elevated temperature or to other vulcanizing conditions is obviated, the irradiation treatment effecting the vulcanization.

The principal object of the present invention is to provide golf balls having a cover, typically of polyethylene or balata, which has enhanced toughness, manifested by unusually good scuffing and cutting resistance, as a result of irradiation. Another object is to provide a method for irradiating the covers of golf balls without adversely affecting the underlying winding of rubber threads under tension. Another object is to provide a method of irradiating golf balls with high-voltage electrons. Another object is to provide polyethylene-covered golf balls having unusually good scuffing and cutting resistance compared to conventional polyethylene-covered golf balls. Another object is to provide for the curing of balata-covered golf balls by irradiation whereby the known complications of conventional vulcanization of balata-covered balls are obviated. Numerous other objects of my invention will more fully hereinafter appear.

In the accompanying drawings:

Fig. 1 is a front elevation of an arrangement for effecting the irradiation of golf balls with high-voltage electrons in accordance with my invention;

Fig. 2 is a side elevation of the arrangement of Fig. 1;

Fig. 3 is a generalized absorption curve convenient for determining the preferred electron voltage to be used in the practice of my invention; and Fig. 4 is a correction curve which may be used in conjunction with the main curve of Fig. 3.

I have discovered a highly effective way of irradiating the covers of golf balls without objectionably injuring the rubber windings. More particularly, I have found that by using high-voltage electrons as the means of irradiation it is possible to successfully irradiate the covers of golf balls in such a manner as to substantially enhance the toughness, scuffing-resistance and cutting-resistance of the covers without objectionably injuring the rubber windings. Still more particularly, I have discovered that by employing high-voltage electrons having a voltage between 200 and 800 kilovolts, and by applying an irradiation dosage equal to from $5\times10^{-5}$ to $2\times10^{-3}$ coulomb per square inch of cover surface area, the cover of the golf ball can be irradiated so as to have considerably enhanced toughness, scuffing-resistance and cutting-resistance without objectionably impairing the properties of the rubber threads of the windings.

In practicing my invention, I subject the covers of the molded golf balls, before or after the final painting operation, to high-voltage electrons generated by any suitable source such as the well-known Van de Graaff accelerator (U. S. Patent 1,991,236 Van de Graaff, February 12, 1955), or a linear accelerator, using electrons at such voltage and in such dosage as to treat substantially the entire area of the cover and thus materially enhance its toughness without adversely affecting the properties of the rubber windings. Preferably the voltage of the electrons should be low enough so that a major proportion of the irradiation which goes into the balls is absorbed in the cover rather than in the winding. For the best results and greatest economy nearly all of the irradiation which is absorbed in the ball should be absorbed in the cover only. By the same token the voltage of the electrons will be high enough so that the cover is penetrated by the electrons for at least the greater part of its thickness. The selection of the voltage and of the extent of irradiation so as to achieve the desired results, i. e., maximum irradiation of the cover with minimum wastage of electrons by absorption in the windings, can be readily made by those skilled in the art in the light of this description.

With respect to voltage limitations, if one takes as typical a ball having a polyethylene cover 0.050 inch thick with a specific gravity of 0.95, and if the electrons have a voltage of 800 kilovolts, they will give half their energy to the cover, the remaining energy going into the underlying windings and core. On the other hand, if their voltage is 300 kilovolts, 90% of their energy will be given to the outer one-half layer of the cover. Accordingly the applied electron voltage usually should be greater than 300 and less than 800 kilovolts, but it is understood that some increase or decrease of voltage may be required for thicker or thinner covers.

With respect to electron dosage, I prefer to employ between $5\times10^{-5}$ and $2\times10^{-3}$ coulomb per square inch of cover surface area.

Commercial forms of the Van de Graaff accelerator can be adjusted to deliver electrons at the desired voltage. More generally, however, the accelerator will be designed to give electrons of the desired voltage range. The voltage may also be reduced to the desired value by interposing shielding of any electron-absorbing material, such as sheets of paper, between the beam source and the objects to be irradiated.

In practicing my invention, it is necessary that the balls be irradiated as uniformly as possible over their entire surface. This is conveniently done by turning the balls in any suitable manner so as to expose progressively all parts of the cover surface to the electron beam. For example, they may be maintained stationary and intermittently be turned to other positions until the covers have been substantially uniformly treated. Any other suitable mechanical means can be provided, such as means for continuously turning the balls undergoing treatment, or for moving an electron beam about a stationary ball. More than one electron source can be used, so as to scan the balls simultaneously from two or more directions.

I have obtained unusually good results by applying my invention to balata-covered balls and polyethylene-covered balls. My invention will now be described with particular reference to these two different types of balls.

Balata is the principal material used at present for the cover in the manufacture of golf balls. In order to toughen and dimensionally stabilize the cover, it is usually given a light vulcanization. One commercial method is vulcanization by means of sulfur and a powerful organic accelerator combination which is formed in situ, for example, by incorporating zinc oxide and an amine in the cover stock, molding the cover on the ball, and subsequently exposing the covered ball to carbon disulfide whereby the amine and the carbon disulfide react in the cover to form the accelerator, after which the cure of the covers is effected by subjecting the balls to a moderate heat treatment, for example 10 hours at 115° F. This method has certain disadvantages. For example, the use of the organic accelerator is undesirable because it often leads to spot formation on the painted balls. The carbon disulfide is undesirable because of its toxic nature and its fire hazard. Golf balls are also cured directly in molds, the cover stock containing a complete vulcanizing combination before being molded. This method requires no carbon disulfide, but it does require very close control of the uncured cover stock, which is very scorchy, and it affords no opportunity for re-working cured overflow stock. Also, the heat applied during vulcanization by either method tends to injure the rubber of the threads of the winding during the curing of the cover. Such degradation is manifested by a relaxation in the tension of the winding and in a lowering of its elongation.

By irradiating balata-covered balls in accordance with my invention, the desired toughening can be achieved, simultaneously with stabilization of the cover.

In the practice of this aspect of my invention, the sulfur, zinc oxide and organic amine are of course omitted from the balata cover stock, and the carbon disulfide and the heat treatment to effect vulcanization are also omitted. The effects of the ionizing radiation are confined to the cover by using electrons in a certain voltage range as the ionizing radiation so that the energy is absorbed principally by the cover.

Thus, the painting problems which have been associated with the use of sulfur and organic accelerator in the conventional process of making balata-covered balls are eliminated by the use of irradiation to effect the cure, in accordance with my invention. Since the curing action of ionizing radiation is largely independent of temperature, no heating is required during the irradiation, and consequently no degradation of the winding need take place. Sources of high-voltage electrons are now available which are capable of causing the desired cure of the balata covers in a matter of seconds, in contrast with the many hours required in the currently used sulfur vulcanization process. This rapid cure lends itself readily to a continuous process of treating golf balls by irradiation.

It has also been proposed heretofore to cover golf balls with polyethylene. However, the comparatively small number of polyethylene-covered balls on the market have met with poor customer acceptance because of their inferior properties. Nevertheless, polyethylene, being much cheaper than balata, is an attractive material for use in golf ball covers if its physical properties can be improved. Also, by the inclusion of an appropriate amount of a pigment, such as titanium dioxide, in the polyethylene cover, it is possible to make an attractive ball without painting. The principal drawbacks of the polyethylene-covered balls are the poor cutting resistance and the development of an unsightly skinning, peeling or flaking of the surface when hit or abraded. However, by irradiating polyethylene-covered balls in accordance with my invention, both of these deficiencies are largely removed, to such extent as to make feasible the production of a commercially acceptable polyethylene-covered ball. Another disadvantage of ordinary polyethylene golf ball covers is that it requires a relatively high molding temperature (about 265° F.) which is detrimental to the winding and results in the production a softer ball. The molding temperature required can be lowered by using a polyethylene of lower molecular weight, but this results in a sacrifice in the physical properties of the cover which are already poor in comparison with the standard balata cover. The toughening resulting from irradiation in accordance with my invention will be sufficient to permit the use of a polyethylene of low molecular weight in the molding of the cover whereby a low molding temperature can be used, resulting in the production of a hard ball.

Referring now to Figs. 1 and 2 of the accompanying drawings, a beam 1 of high voltage electrons, generated by any suitable source (not shown), such as the aforementioned Van de Graaff accelerator or the Cockcroft-Walton accelerator, is projected downwardly through a suitable structural housing 2 provided with a conventional cooling coil (not shown) around its lowermost portion and through a window 3, which typically consists of a thin sheet of aluminum, onto the covers of molded golf balls 4 supported on any suitable surface 5. Surface 5 can, if desired, take the form of a channel along which the golf balls 4 are made to roll so as to expose different surfaces. Alternatively, as previously indicated, the balls can be supported by some form of mechanical device for rotating them individually during exposure. In either case the arrangement is such as to effect uniform irradiation over the entire surface of the cover. The voltage of the electrons is adjusted to a value within the limited range indicated above. The electron beam 1 scans the balls 4 as a result of being moved back and forth, lengthwise of window 3. The beam width can be adjusted in known manner either by suitable magnetic field controls, or by varying the distance from the window to the balls so as to make the beam width equal to the ball diameter. By magnetic means the path of the beam may also be made to traverse back and forth across the path of the balls.

The ionizing radiation employed in my invention, if improperly applied, may adversely affect the rubber thread winding under the cover. In order to obtain the full advantage of irradiation, I prefer to confine the radiation to the cover. That the properties of high-voltage electrons make this possible can be deduced from the generalized absorption curve shown in Fig. 3. Since the absorption of energy from high-speed electrons depends primarily on the weight of material traversed and not much upon its nature, it is customary to express thickness in terms of grams per square centimeter. Also, since, to a first approximation, penetration by the electrons is proportional to their energy, it is convenient to divide the thickness by the voltage of the electrons to obtain a generalized curve as shown in Fig. 3. However, this last approximation is not very good in the lower voltage range; thus, 500-kilovolt electrons will penetrate less than one-half as far as 1,000-kilovolt electrons. In order to take this into account, the correction curve given in Fig. 4 may be used in conjunction with the main curve of Fig. 3. Thus, in locating the value for the thickness divided by the voltage for the main curve of Fig. 3, the "calculated" voltage from Fig. 4 should be used instead of the actual voltage.

A typical polyethylene-covered golf ball construction has a cover with a thickness of about 0.050 inch and a specific gravity of 0.95, and so its thickness can be expressed as 0.12 g./cm.$^2$. The maximum voltage permissible would be 800-kilovolts, for this thickness. For optimum results electrons at 550-kilovolts are used. Reference to the correction curve of Fig. 4 shows that the "calculated" voltage is 320-kilovolts, giving a value of 0.37 for thickness divided by "calculated" megavolts. Using this value in conjunction with the main curve of Fig. 3, it has been calculated that, for this thickness, 90% of the energy of 550-kilovolt electrons would be absorbed in the cover and only 10% would go on through to the winding. Furthermore, the inner side of the cover would receive 85% as much energy as the outer side. Such a favorable distribution of energy absorption cannot be obtained with gamma-ray energy (such as is given off by cobalt 60), nor with X-ray energy, both of which undergo simple exponential absorption. Thus, the highly penetrating gamma-rays would degrade the winding of the balls to a serious extent.

Although reference has been made to a cover having a thickness of 0.050 inch, it should be pointed out that golf ball covers may vary from 0.025 inch to 0.055 inch in thickness. Although reference was made above to a polyethylene cover having a specific gravity of 0.95, balata golf ball cover compositions are generally made to a 1.10 specific gravity.

The information given by Fig. 3 is sufficient to establish reasonable limits for the preferred voltage of the electrons to use in the practice of my invention. I prefer to use a voltage greater than 200 and less than 800 kilovolts. A reasonable upper voltage limit is that voltage which gives the electrons sufficient energy so that more than half the energy is absorbed by the cover and less than half goes into the winding, with the result that the major part of the energy is utilized in bringing about the desired toughening of the cover and less than half is wasted in degradation of the winding. A more highly preferred upper limit is 700-kilovolts.

With progressively lower voltages, within the stated range, the energy absorption will be concentrated more and more in the outer portions of the cover. This is not disadvantageous because it is the outer portion which receives the greatest wear during use. From Fig. 3, it can be shown that electrons having a voltage of 300-kilovolts would, in the case of a cover 0.050 inch thick and having a specific gravity of 0.95, transfer 90% of their energy to the outer half of the cover, leaving the inner half virtually untreated. It is unlikely that substantially lower voltages than 300-kilovolts would be desirable for practical use. In any case, the use of electrons having a voltage of substantially less than 200-kilovolts is undesirable because of excessive absorption of energy by the window of the apparatus producing the high-speed electrons. This window absorption is wasteful of the expensive electron energy. Furthermore it leads to a very serious problem of excessive heating of the window, resulting in actual melting of the window or in rapid corrosion thereof.

Thus, it will be seen that, although in its broader scope my invention contemplates the use of electrons at voltages between 200 and 800-kilvolts, I much prefer to use electrons having a voltage of from 300 to 700-kilovolts, when treating polyethylene or balata covers having thicknesses ranging from 0.025 inch to 0.055 inch and having a specific gravity of from 0.95 to 1.10.

Suitable types of apparatus for producing the desired high-speed electron beam include the Van de Graaff accelerator, the resonance transformer, the Cockcroft-Walton accelerator, and the linear accelerator.

The desirable effects of irradiation with electrons in accordance with my invention do not require that the temperature of the balls exceed room temperature. Since higher temperatures are detrimental to the winding, the full advantage of my invention is best obtained by keeping the balls near room temperature or below room temperature during the irradiation. However, the absorption of electron energy leads to liberation of heat in the cover. In the case of the higher dosages contemplated by my invention, this heat liberation would cause an undesirable heating of the cover unless means were provided for dissipating this heat. Since the heat liberation occurs only in the cover, the solution of this problem is quite simple and can consist simply of a spray of cold liquid or a blast of cold air on the balls undergoing irradiation. The cooling can be carried out simultaneously with the irradiation or it can be done intermittently between interrupted radiation exposures. The balls can be precooled before their initial placement in the beam. In the case of simultaneous irradiation and cooling of the balls, the current of the electron beam should be so limited that the total irradiation period extends over a matter of minutes instead of seconds in order to allow dissipation of the heat. Thus rise in temperature is prevented by supplying the radiation energy no faster than the heat can be removed.

The curing of balata-covered balls by irradiation in accordance with my invention offers a definite advantage over the conventional method of curing balata-covered balls, as a result of the shortness of the irradiation cure and as a result of the possibility of using lower temperature in the irradiation cure by cooling the balls during irradiation. I prefer to so carry out the irradiation that the temperature of the windings does not exceed 100° F., in order to avoid undue softening of the balata. Still more preferably, I so carry out the irradiation that the temperature of the windings does not exceed 75° F.

With polyethylene covers, there is no problem of softening the cover excessively during the irradiation so long as the temperature of the cover is kept below 200° F.

The cover stocks of the balls treated by my invention are formulated in any conventional manner except that, as already indicated, in the case of balata covers vulcanizing ingredients are omitted. Usually the stocks will contain a minor proportion, variously from 2 to 25% of the weight of the main binding component or components of the stock, of white pigment, for example, titanium dioxide, less being used in polyethylene than in balata. In the case of both polyethylene and balata cover stocks, it may also be desirable to include a small proportion of natural rubber or other elastomeric or plastic material. Painting is usually dispensed with in the case of polyethylene-covered balls made in accordance with my invention.

There now follows a description of three series of tests which demonstrate my invention. For this purpose cover stock formulations were prepared as follows:

A. Polyethylene stock:
Polyethylene (mol. wt. 21,000) _____ 100.
Titanium dioxide _____ 2.
Ultramarine blue _____ 0.01

B. Balata stock for cure by irradiation:
Balata [1] _____ 74
Other elastomer [1] _____ 26
Titanium dioxide _____ 8
Zinc oxide _____ 15

[1] Balata can be replaced by gutta percha.

C. Balata stock for conventional sulfur cure:
Balata [2] _____ 74
Other elastomer [1] _____ 26
Titanium dioxide _____ 8
Zinc oxide _____ 15
Methazate _____ 0.8
Sulfur _____ 0.8

[1] Polyisobutylene, Hevea rubber, high-styrene/butadiene copolymer are examples.
[2] Balata can be replaced by gutta percha.

SERIES I

In this series, a group of six golf balls was prepared, three having polyethylene covers (formula A) and three having uncured balata covers (formula B). The thickness of the covers was approximately 0.049 inch, and the diameter of the balls was 1.68 inches (the regulation size). Two of the polyethylene-covered balls and two of the balata-covered balls were then exposed to an electron beam from a Van de Graaff accelerator. The accelerator was adjusted to deliver a beam current of 100 microamperes, the electrons being accelerated through a voltage drop of 550-kilovolts. The electrons, as a beam about 1 cm. wide, came through an aluminum foil window into the atmosphere. The beam was scanned rapidly back and forth over a six-inch path. The balls were passed back and forth across the scanned path of the beam, i. e. transversely of this scanned path, in order to obtain complete exposure of the projected hemispherical surface of the ball in each position to the beam. In order to approximate uniform treatment, each ball was exposed to the beam in each of six different positions spaced equidistantly according to the intersection of Cartesian coordinate axes with the surface of the ball, the origin being the center of the ball. In the case of the polyethylene balls, each of the six exposures was such as to cause the passage of $1.3 \times 10^{-4}$ coulomb of electrons through the exposed surface. In the case of the balata-covered balls, more exposure was given; in fact, each of the six exposures per ball was such as to cause the passage of $5.3 \times 10^{-4}$ coulomb of electrons through the exposed surface. Comparisons of the treated balls with the untreated controls showed that a substantial toughening of the surface had been effected by the irradiation treatment.

Although I usually limit the penetration of the electrons by suitable regulation of the electron source, it is sometimes convenient to limit the penetration of the high energy electrons by allowing them to pass through shielding material before entering the ball cover. This means was employed in the next two series of tests.

SERIES II

A set of 100 balls having polyethylene covers approximately 0.049 inch thick and of a specific gravity of 0.934 was prepared. These balls were irradiated with the same accelerator used in Experimental Series I. They were exposed in only two positions, namely, mutually opposite faces. The penetration of the electrons into the balls was controlled, as a matter of convenience, by interposing a certain amount of absorptive material (sheets of paper) between the balls and the window of the beam, thus limiting the voltage of the electrons reaching the balls. In treating most of this set of balls, the accelerator was operated at its full voltage of 2000-kilovolts but 0.58 g./cm.$^2$ of paper was placed between the balls and the window of the beam. The cover itself had a thickness of 0.12 g./cm.$^2$. Thus, the cover was absorbing energy corresponding to that in the interval between 0.29 (i. e., 0.58/2) and 0.35

$$\left(\text{i. e., } \frac{0.58 + 0.12}{2}\right)$$

of Fig. 3. The degree of absorption by the paper was such that the inside of the cover of the ball was receiving energy at the same rate as the top surface of the paper used for shielding, while the outside surface of the cover was receiving energy at about 1.4 times that rate. In other words, the arrangement was such that the ionization density attained substantially its maximum value at about the point where the beam had just passed through the paper shielding, and in passing through the cover it decreased to such an extent that the inside portion of the cover was receiving energy at the same rate as the top surface of the paper shielding. The balls were divided into five different groups and each group was given a treatment as specified in Table I below.

Table I.—*Irradiation of polyethylene-covered golf balls using 2-megavolt electrons from Van de Graaff accelerator*

| Group No. | Shielding | Irradiation Treatment [1] | PGA Hardness [2] | Cutting Resistance | Durability [3] |
|---|---|---|---|---|---|
| 1 | None | None | 23 | 80 | O. K. |
| 2 | Paper, 0.58 g./cm.$^2$ | $5.3 \times 10^{-4}$ coulomb/ball. | 20 | 92 | O. K. |
| 3 | ---do--- | $1.6 \times 10^{-3}$ coulomb/ball. | 16 | 92 | O. K. |
| 4 | ---do--- | $4 \times 10^{-3}$ coulomb/ball. | 10 | 94 | 1 no good. |
| 5 [4] | None | ---do--- | 0 | 100 | All no good. |

[1] This irradiation was directed toward two opposing faces.
[2] PGA hardness is a measure of the hardness of the ball widely used in the industry; the higher the reading the harder the ball.
[3] Durability is a qualitative observation on the effects of 25 machine blows on a ball.
[4] All of these balls went out of round from heating and/or gassing and in every case the windings were seriously damaged.

Table I shows that irradiation of the polyethylene covers in accordance with my invention substantially increased their cutting resistance. During the testing it was observed that, as a result of the irradiation, there was no skinning or peeling of the polyethylene surface when the balls were hit or abraded. The data in Table I show clearly the desirability of limiting the penetration of the radiation. Thus, in group 5, in which 2000-kilovolts was used, the balls were much softer than any of the others, and the durability was very poor, indicating extensive damage to the interior of the balls. This was confirmed by physical tests made on the rubber thread windings taken from these balls, the well-known T–50 and elongation tests being used. The results of these tests are given in Table II.

Table II.—*Properties of thread from the irradiated balls of Table I*

| Group No. | T–50 | | Elongation | |
|---|---|---|---|---|
| | Under Cover, °C. | Near Center, °C. | Under Cover, Percent | Near Center, Percent |
| 1 | −13.5 | −13.0 | 702 | 715 |
| 2 | −14.5 | −14.0 | 680 | 762 |
| 3 | −15.7 | −15.4 | 630 | 700 |
| 4 | −12.5 | −10.5 | 567 | 672 |
| 5 | −22.7 | −21.0 | 394 | 442 |

The very low T–50 values and the low elongation of the thread from the balls of group 5 confirm the fact that radiation at too high a voltage materially injured the winding. On the other hand, irradiation at a proper voltage, as in groups 2 to 4, caused little change in the properties of the winding thread.

SERIES III

In this series both polyethylene-covered and balata-covered balls were irradiated. With the exception of the balata-covered balls of group 10 in Table III below, none of the balls contained vulcanizing ingredients in the cover stock. The balls were treated in each of the six positions as described in Series I. Shielding with 0.58 g./cm.$^2$ of paper was used as in Series II, and the accelerator was operated at 2 million volts. In this series 80 polyethylene-covered balls and 80 balata-covered balls were used, these being treated in groups of 20. The extent of irradiation treatment and the pertinent results are given in Table III.

Table III.—*Irradiation of golf balls with 2 million volt electrons through a 0.58 g./cm.$^2$ paper shield*

POLYETHYLENE BALLS

| Group No. | Irradiation Treatment | PGA Hardness | Cutting Resistance | Durability | Gel, Percent |
|---|---|---|---|---|---|
| 6 | None | 32 | 93 | O. K. | 0 |
| 7 | $4 \times 10^{-4}$ coulomb/ball | 30 | 95 | O. K. | 21 |
| 8 | $8 \times 10^{-4}$ coulomb/ball | 30 | 97 | O. K. | 33 |
| 9 | $1.6 \times 10^{-3}$ coulomb/ball | 33 | 96 | O. K. | 71 |

BALATA BALLS

| 10 | None [1] | 80 | 65 | O. K. | 95 |
| 11 | $1.6 \times 10^{-3}$ coulomb/ball | 80 | 71 | O. K. | 60 |
| 12 | $4 \times 10^{-3}$ coulomb/ball | 78 | 71 | 1 no good | 87 |
| 13 [2] | ---do--- | 79 | 71 | O. K. | 88 |

[1] The balls in group 10 were not irradiated but the covers were compounded and cured with conventional curing ingredients.
[2] The balls in group 13 were painted before being irradiated.

The data in Table III show that, in the case of the polyethylene-covered balls, irradiation according to the invention improved the cutting resistance, and imparted a high gel content (evidence of cure) to the polyethylene covers. The gel content is the percent which is insoluble in boiling xylene. The data in Table III also show that in the case of the balata balls the cutting resistance of the irradiated balls (groups 11 to 13) was greater than that of the conventionally cured balata balls (group 10).

Having thus described my invention, what I claim and desire to protect by Letters Patent is:

1. The method which comprises irradiating the cover of a golf ball, the said golf ball having a winding of rubber threads under tension underlying the said cover, the said cover comprising a material selected from the group consisting of balata and polyethylene, with electrons having a voltage above 200 kilovolts and below 800 kilovolts, the dosage of said irradiation being equal to from $5 \times 10^{-5}$ to $2 \times 10^{-3}$ coulomb per square inch of cover surface, whereby the said cover acquires good scuffing and cutting resistance without damage to the said winding.

2. A method as in claim 1 in which the said golf ball cover comprises polyethylene.

3. A method as in claim 1 wherein the said golf ball cover comprises balata.

References Cited in the file of this patent

UNITED STATES PATENTS

| | | |
|---|---|---|
| 1,906,402 | Newton | May 2, 1933 |
| 2,668,133 | Brophy et al. | Feb. 2, 1954 |

OTHER REFERENCES

"Modern Plastics," for April 1954, pp. 100, 101 and 219 cited.

"Nucleonics" for June 1954, pp. 18–25 cited.

"Nature" for July 11, 1953, pp. 76 and 77 cited.